Nov. 19, 1963 T. A. EVANS ETAL 3,111,471
ELECTRICAL TREATMENT OF POLYETHYLENE FILM
Filed July 5, 1960

INVENTORS.
Thomas A. Evans
Albert J. Palfey
BY Merlin B Davey
AGENT

| United States Patent Office | 3,111,471 |
|---|---|
| | Patented Nov. 19, 1963 |

3,111,471
ELECTRICAL TREATMENT OF POLY-ETHYLENE FILM
Thomas A. Evans and Albert J. Palfey, Midland, Mich., assignors to The Dow Chemical Company, Midland, Mich., a corporation of Delaware
Filed July 5, 1960, Ser. No. 40,906
4 Claims. (Cl. 204—168)

This invention relates to a method of electrically treating polyethylene film to improve the anchorage characteristics of its exposed surface whereby various materials such as printing ink or adhesive may be firmly secured thereto. More particularly, it relates to the use of an electrically conductive treating roll coated with a phenol-formaldehyde resin, in the process of passing a polyethylene film through an electrical discharge between an electrode and a dielectrically coated conductor roll.

The electrostatic treatment of polyethylene film involves subjecting the surface of the article to be treated to an electrical glow discharge, or corona, advantageously a continuously high frequency and high voltage discharge.

It is more economical to treat the film at elevated temperatures, hence it is preferred to treat the film substantially immediately following its formation. We have also discovered that polyethylene film or sheet placed between an electrode and an electrical ground discharging an electrical glow will impart anchorage characteristics to both surfaces of the film when there is an air gap between electrode and film, and the electrical ground and the film. Unfortunately such treated film has the objectionable characteristics of blocking or bonding of successive film layers when wound on a roll or stacked in layers. Still another disadvantage of a two side treatment is the transfer of printing ink from a printed sheet to the unprinted opposite side of an adjacent sheet when placed together. Therefore, it is necessary to maintain the film flat on the dielectric to prevent a corona discharge on the side of the film in contact with the dielectric.

We have experimented with various dielectric materials for the electrostatic treating process. Most of these dielectric materials tested were effective for only short periods of time. After 20 or 30 hours of operation, the dielectric material broke down and permitted the electric arc to pass through thus burning the film and causing an uneconomical delay for repairs.

Among the most common dielectric materials used are Mylar film and glass. The disadvantages of Mylar film have been cited in the Kaghan et al., Patent No. 2,859,481, column 6, and the Berthold et al., Patent No. 2,859,480. Conventional glass coatings have not been satisfactory because foreign materials in the glass permit the electrical discharge to burn through the glass coating and destroy the film being treated.

We have discovered that a baked dielectric coating of a phenol-formaldehyde resin which is free from water and completely soluble in lacquer systems or organic solvent such as ethyl alcohol or acetone and which may contain as much as 45 weight percent of an inert, finely divided, non-fibrous, inorganic, suspensible, pigment or filler such as ochre, sienna, cinnabar, barium sulfate, lithopone, zince oxide or sulfide, umber, titanium dioxide, kaolin and the like, such as those prepared in U.S. Patents 2,253,253 or 2,198,939, considerably prolongs the time for which the effective electrical treatment of polyethylene film can be continued before failure of the coating occurs therefore substantially eliminating costly shut down of a film treating process.

We have further found that improved results are obtained when a multiplicity of layers of the dielectric coating are applied to the treater roll. The total thickness of the dielectric coating desired is dependent upon the voltage employed for the electrostatic discharge. When treating at 9600 volts, for example, a coating thickness of 32 mils is advantageously employed. At higher voltages a thicker coat is preferably used, while at lower voltages a thinner coat may be employed. For long treater roll life, however, it is not desirable to employ a coating of less than about 20 mils (layers) in thickness.

The polyethylene film may be treated at any speed from about 10 to about 400 feet per minute at voltages up to 25,000 volts or higher. Preferably, voltage of from about 2,000 to 20,000 are employed at a frequency of up to about 500 kilocycles.

Another advantage of our invention is the high temperature resistance of the dielectric material which permits electrical treatment of the film immediately after its formation and results in better treatment and extended uninterrupted treater life.

Still another advantage of our dielectric is the ability to reface or patch the coating with conventional machine equipment without destroying the effectiveness of the dielectric.

Other advantages will become apparent hereinafter.

The invention may be better understood by reference to the attached drawings in which FIG. 1 represents a film bubble process making double windup sheet mill rolls treated on one side;

Figure 1:
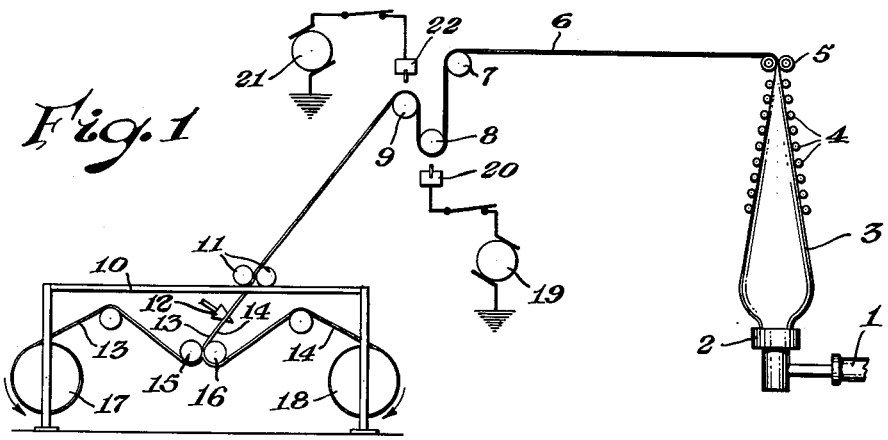

The principle of our invention is illustrated in FIGURE 1, showing a plastics extruder 1, discharging molten polyethylene through a die 2, forming an inflated tube 3, and a flat tube 6 via converging rolls 4. From pinch rolls 5, the flattened tube 6, passes over idler roll 7, then around the film treater roll 8, and up and over film treater roll 9. The film enters winder 10, at pinch rolls 11, where knife slitters 12, trim the edges of the flattened tube 6, forming two separate sheets 13 and 14 which pass through rolls 15 and 16 where the two sheets 13 and 14 are separated and hence wound into separate mill rolls 17 and 18.

FIGURE 1 further illustrates a high frequency high voltage generator 19, and an electrode 20, in position and treating the film via treater roll 8, thereby treating one side of sheet 14. A similar generator 21, and an electrode 22, are treating one side of sheet 13. Therefore, two mill rolls 17 and 18 are produced with electrostatic treatment on one side only.

Figure 2:
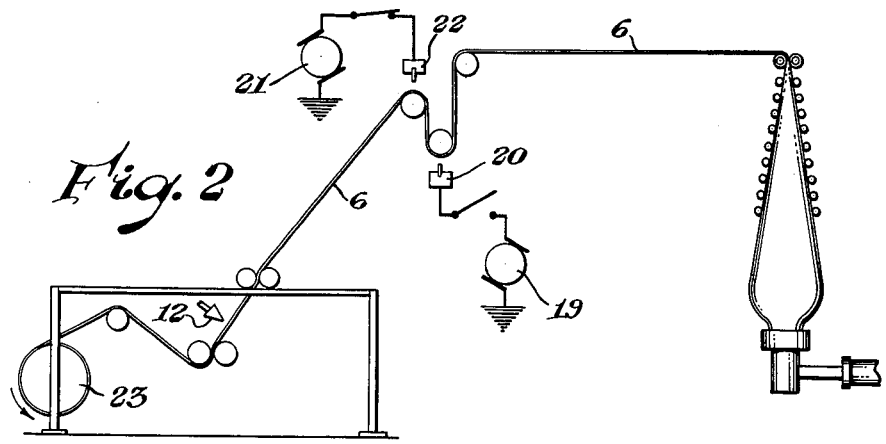
FIG. 2 represents a film bubble process making single windup tubing treated on one side.

FIGURE 2 illustrates equipment similar to the arrangement of FIGURE 1 except that the electrical generator 19, is in the Off position and inoperative. The electrical generator 21, is in the On position and operating. Knife slitters 12, are out of position and not trimming the film. Consequently a flattened tube with electrostatic treatment on one side is wound into a mill roll 23, in FIGURE 2.

Figure 3:
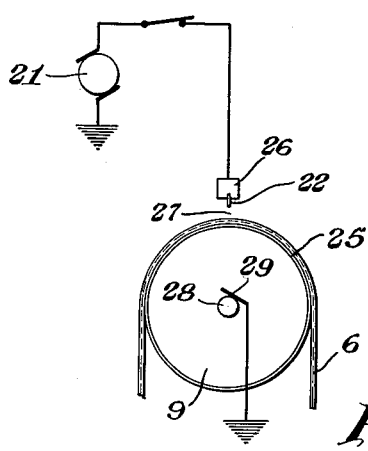
FIG. 3 represents a film treater assembly.

An enlarged drawing of one treater roll assembly is shown in FIGURE 3. Roll 9, made of an electrical conducting material, is coated 25, with a baked on dielectric coating, e.g., a phenolic resin, on its exposed surface onto which the flattened tube 6, comes into immediate contact. A high frequency high voltage, generated in generator 21, is transmitted to a knife edge or, other shaped electrode 22, which is retained in an insulator 26. An electrical glow discharge breaches the air gap 27, and imparts the treatment to the electrode 22, side of the tube sheet 6. The opposite side of tube 6 is untreated since the phenolic coating 25, prevents an electrical glow discharge on that side of the film. Roll 9 rotates about the axis of shaft 28 and by way of suitable contactor or slip ring 29, completes the electrical circuit to ground.

Figure 4:
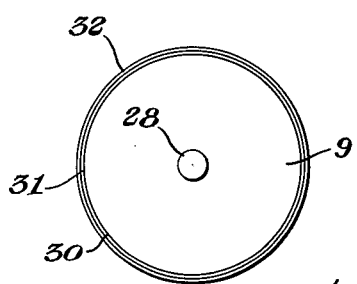
FIG. 4 represents a fragmentary view of the development of a dielectric coated roll in accordance with the present invention.

A side view of the development of a phenolic coating roll is shown in FIGURE 4. An untreated electrical conducting roll 9, concentric about an axis of rotation has a surface 30, cleaned and prepared by sandblasting or other means, to assure a good bond for the coating. The first coat 31, is applied uniformly with a conventional paint sprayer or other means, to a thickness of about 0.001 and is air dried after which a second coat 32 is applied and air dried. The combined coating is then baked in an oven at about 350° F. for about one-half hour. The roll 9, is then removed from the oven and cooled to ambient temperature. This procedure is continued until the desired dielectric coating thickness is applied. We have found a coating of about 0.032" or 32 layers is sufficient for effective electrostatic treatment for normal long life. In practice the resin composition may be applied manually with a conventional paint spray gun to a substantially uniform thickness. Advantageously, the coating may be ground to an even surface before placing in operation. Rolls made by this procedure have been successfully treating film for over 4000 hours and continue to perform satisfactorily.

The coating and process of this invention is not limited to the use of a circular coated treater roll. It may be utilized in any shaped conductor, such as flat, curved, and the like. It is also possible to place the dielectric coating on the electrode rather than on the ground side without departing from the scope of this invention. While the film process illustrated is the "Bubble Process," the intent of this invention is not limited to this procedure of film manufacture, nor is it limited to any particular location in the film production process.

What is claimed is:

1. In a process for electrically treating polyethylene film by passing the film through an electrical glow discharge between an electrode and a dielectrically coated conductor roll, the improvement which comprises employing as the dielectric coating on the conductor roll a phenol-formaldehyde resin which is free from water and completely soluble in lacquer systems.

2. The process of claim 1 wherein the coating consists of from about 20 to about 50 layers of resin, said layers being about 1 mil in thickness.

3. The process of claim 2 wherein the resin contains up to about 45 weight percent of an inert, inorganic, non-fibrous, suspensible filler.

4. In an apparatus for electrical treatment of plastic film which apparatus comprises a pair of electrodes and means for generating an electrical glow discharge therebetween, one of said electrodes being a rotatable electrode having an insulating coating on a peripheral surface thereof, the improvement wherein the rotatable electrode is coated with from about 20 to about 50 layers, each layer being about one mil in thickness and baked, of a phenol-formaldehyde resin which is free from water and completely soluble in lacquer systems.

References Cited in the file of this patent
UNITED STATES PATENTS

| | | |
|---|---|---|
| 2,136,572 | Winkelmann et al. | Nov. 15, 1938 |
| 2,403,241 | Schaefer | July 2, 1946 |
| 2,864,756 | Rothacker | Dec. 16, 1958 |